G. C. Cassard.
Lard Cooler.
No. 3,358. Reissued Apr. 6, 1869.
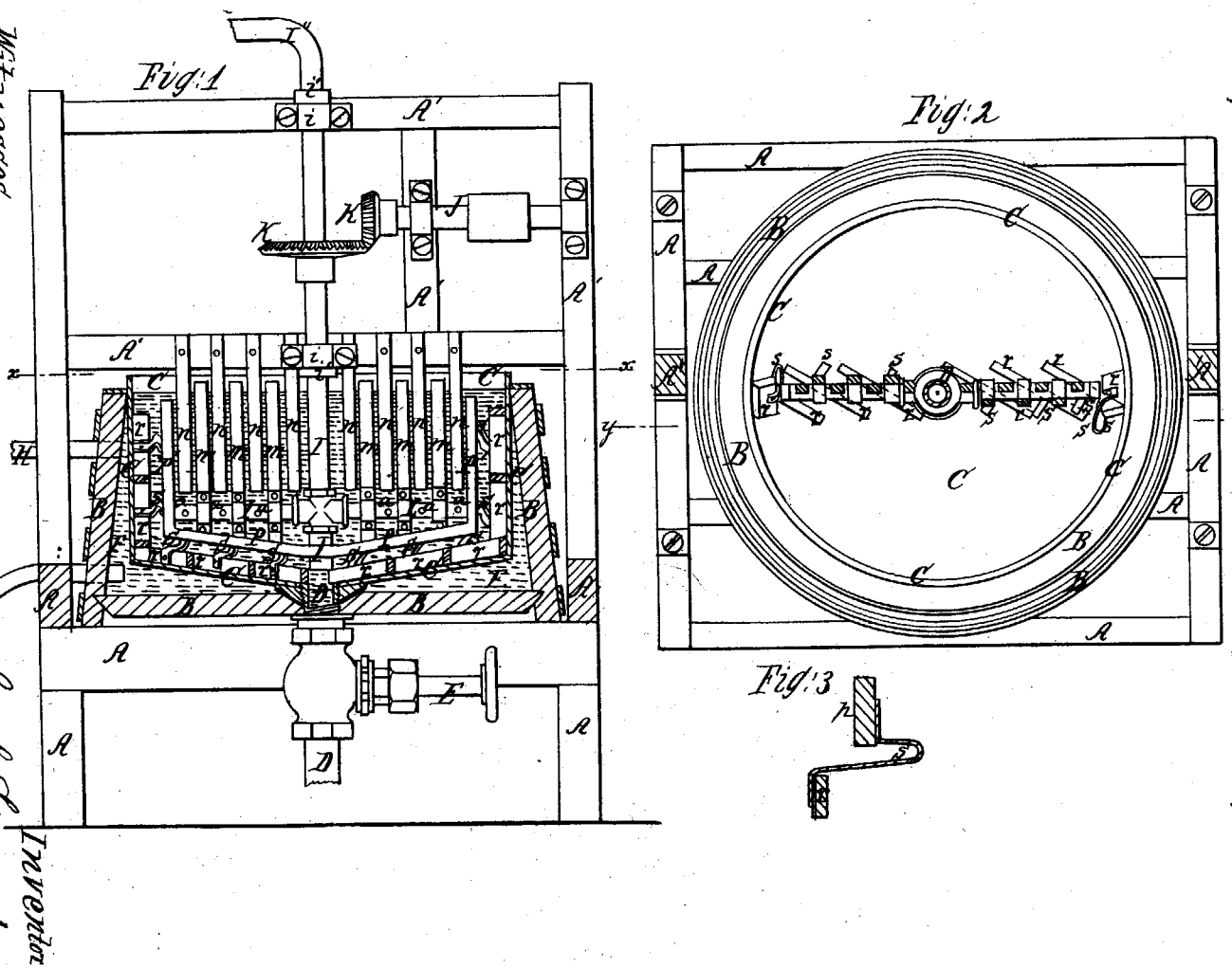
Witnesses
S. C. Kamion
C. A. Pettit
Inventor
Geo. C. Cassard
By Munn & Co.
Attorneys
N. PETERS, PHOTO-LITHOGRAPHER, WASHINGTON, D. C.

United States Patent Office.

GEORGE CARLETON CASSARD, L. CASSARD, AND J. L. CASSARD, OF BALTIMORE, MARYLAND, ASSIGNEES OF GEORGE CARLETON CASSARD.

*Letters Patent No.* 78,925, *dated June* 16, 1868; *reissue No.* 3,358, *dated April* 6, 1869.

IMPROVED LARD-COOLER.

The Schedule referred to in these Letters Patent and making part of the same.

*To all whom it may concern:*

Be it known that I, GEORGE CARLETON CASSARD, of the city and county of Baltimore, and State of Maryland, have invented a new and improved Anti-Granulating Lard-Cooler; and I do hereby declare that the following is a full, clear, and exact description of the construction and operation of the same, reference being had to the accompanying drawings, making a part of this specification, in which—

Figure 1 is a vertical section through the line *y y* of fig. 2.

Figure 2 is a horizontal section through the line *x x* of fig. 1.

Figure 3 is a detached view of one of the scrapers, with the spring by which it is supported.

The object of this invention is to enable lard to be rapidly cooled in large quantities, by machinery, in such a manner that it shall not granulate, thereby improving its quality.

In the drawings—

A A′ represent the supporting frame, preferably of wood, the table upon which the tank rests being designated by the letter A, and that part of the frame which projects above said table, to support the shafting and gearing, being represented by A′.

B is a tub, or tank, the walls of which incline inward, as shown in fig. 1, giving the tank the form of a frustum of a cone.

Within this tank is a vessel, C, of sheet-metal or cast-iron, the walls of which are cylindrical and vertical, its bottom being funnel-shaped to help convey the lard to the discharge-pipe, and terminating at its centre or lower extremity in a discharge-pipe, D, provided with a cock, E.

The side walls of the vessel C project slightly above the walls of the tank B, in order that any accidental overflow of the tank may not pass into the vessel.

The top or most contracted portion of the tank fits closely against the vessel all around it, but below that point, the walls of the tank recede from the vessel, leaving a space, F, between them.

The bottom of the vessel C, at its centre, rests upon the bottom of the tank, leaving an extension of the space F all around and under the bottom of the enclosed vessel.

Pipes G H pass through the wall of the tank, and connect with this space, in order to enable the operator to fill it with cold water, or a current of cold air, and to regulate, at pleasure, the temperature and quantity of the water in the tank around the vessel C.

The tank and vessel C, being thus constructed and arranged, I hang a vertical shaft, I, (which is made hollow if for air connection,) in the centre of the vessel C, attaching it by boxes *i i* to the frame A′, and providing collars, *i′ i′*, above and below the boxes, to prevent the shaft from working up and down.

This shaft is connected, to the line-shaft J, by any kind of suitable gearing, as shown at K K.

Near the lower end of the suspended shaft I, two horizontal arms, L L, (also hollow if for air connection,) project from it nearly to the wall of the vessel C, each arm, when hollow, having a series of openings, *a a a*, along its side.

The lower end I′, of the vertical shaft, below the horizontal arms, is always made solid.

I″ is a tube, inserted into the upper end of the tubular shaft I, through which air may be forced into the shaft, and from the latter through the arms L L and the holes *a a* into the vessel C.

Directly beneath the arms L L are two strong arms, P P, extending from the lower end of the vertical shaft in a direction parallel to the bottom of the vessel C, beneath them, and terminating at their outer extremities in two upright standards, P′ P′, which rise directly past the ends of the arms L L, and are soldered, bolted, or cast to those arms at that point.

The arms L L and P P serve to support a set of upright wooden slats, *m m*.

Another set, *n n*, is attached to the cross-beam A′ overhead, and projects down into the vessel C, nearly to the hollow arms.

As the shaft I rotates, the slats *m m* are carried round, passing between the others, *n n*, and thoroughly agitating the liquid contents of the vessel.

In addition to these several parts, I attach a set of inclined wooden scrapers, *r r*, by means of bent springs *s s*, to the under side of the arms P P, and the outer side of the standards P′ P′, arranging the scrapers so that, as the central shaft rotates on its vertical axis, they will be drawn around upon the bottom and against the side walls of the vessel, thoroughly scraping the lard from the inner surface of the vessel, and preventing a deposit, or accumulation of cold lard upon that surface, while the lard at other points remains warm and liquid.

The form and arrangement of these springs and scrapers will be readily understood by a glance at the drawings.

The apparatus being thus constructed, its operation is as follows:

The melted lard is introduced into the vessel C, filling the latter, as shown by the broken red lines of fig. 1. At the same time cold water, or a current of cold air is admitted at the connection, filling the space around the vessel C, as shown by the broken greenish lines, fig. 1. The shaft I is then started, and made to rotate slowly, thoroughly stirring up the molten mass, rapidly and uniformly cooling the lard, and preventing its adhesion to the walls and bottom of the vessel.

When working very hot lard, as direct from the rendering-kettle, sometimes at 250° Fahrenheit, the cooling is assisted by a current of cold air from fan-blower, or bellows, forced down the tubular shaft, escaping from the holes *a a* into the liquid lard at all parts of the vessel, and rising through the lard, rapidly reducing its temperature to about 80° Fahrenheit, at which point it is withdrawn.

If thought advisable, to economize cold water, the air can precede the water-cooling, or may be worked simultaneously.

When the lard has been thoroughly cooled in this manner, it is drawn off through the central discharge-spout and valve D E, direct to final package.

It will be found perfectly free from granulation, in which condition the oil and stearine will not separate in warm climates, thereby improving its quality.

It will be observed that in no part of the apparatus in the vessel C is one metallic surface brought into contact with another, so that any grinding or galvanic action will take place, whereby either black oil or corrosion will ensue, discoloring or injuring the lard in any degree.

It will also be observed that the scrapers, by keeping the walls and bottom of the vessel clean, prevent the deposit of a coat of cold lard, which would otherwise accumulate there, and would seriously interfere with the conduction of the cold from the water outside to the melted lard within.

They also enable the lard to be more thoroughly drawn off from the vessel through the pipe D.

In a large vessel, in which nearly two tons (three thousand seven hundred pounds) of lard had been cooled at once, I have found but about nine pounds, or one-fourth of one per cent. of the lard adhering to the bottom and walls of cooler, after running off the lard through discharge-pipe.

Having thus described my invention,

What I claim as new, and desire to secure by Letters Patent, is—

1. The central lard-discharge D, when used in a lard-cooler, substantially as and for the purpose set forth.

2. The scrapers R R, springs *s s*, arms P P, (supporting them,) or their equivalents, for the purpose specified.

3. The combination of the cylindrical tank C, enclosed in the tank B, or other suitable arrangement to form the interval F, for the purpose specified, with the vertical (hollow or solid) shaft I, whose bearings shall be above said tank or its contents, all substantially as set forth.

4. The combination of the shaft I, the fixed slats *n n*, and the movable slats *m m*, supported by and rotated with the shaft and its arms, and meshing between the fixed slats, when said parts are employed in connection with the vessel C and tank B, having the interval F, as described.

5. The central discharge, in combination with the funnel-shape bottom of tank C, or its equivalent, not restricting myself to either shape or material in construction, but all substantially as described, and for the purpose specified.

GEO. CARLETON CASSARD.

Witnesses:

V. C. ARMSTRONG,

EDWARD MOORE.